United States Patent [19]
Kreiger et al.

[11] Patent Number: 6,009,711
[45] Date of Patent: *Jan. 4, 2000

[54] APPARATUS AND METHOD FOR PRODUCING POWER USING GEOTHERMAL FLUID

[75] Inventors: Zvi Kreiger, Kefar Veradin; Uri Kaplan, Doar Na Emek Soreq, both of Israel

[73] Assignee: Ormat Industries Ltd., Yavne, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 08/910,995

[22] Filed: Aug. 14, 1997

[51] Int. Cl.$^7$ ........................................... F03G 7/00
[52] U.S. Cl. .............................. 60/641.2; 60/653; 60/676
[58] Field of Search ................................ 60/641.2, 641.3, 60/641.5, 653, 676

[56] References Cited

U.S. PATENT DOCUMENTS

| | | |
|---|---|---|
| 3,802,185 | 4/1974 | Tullock . |
| 4,132,075 | 1/1979 | Fleck et al. . |
| 4,542,625 | 9/1985 | Bronicki ................. 60/641.2 |
| 5,038,567 | 8/1991 | Moritz . |
| 5,400,598 | 3/1995 | Moritz et al. ........... 60/641.2 |
| 5,531,073 | 7/1996 | Bronicki . |
| 5,671,601 | 9/1997 | Bronicki et al. ........ 60/641.2 X |
| 5,694,772 | 12/1997 | Weinberg et al. ....... 60/641.2 |

OTHER PUBLICATIONS

Valdimar K. Jonsson et al. "Optimization of geothermal Power Plant by use of Freon Vapour Cycle", *Timarit VFI*, 1969.

*Primary Examiner*—Hoang Nguyen
*Attorney, Agent, or Firm*—Nath & Associates; Gary M. Nath; Jerald L. Meyer

[57] ABSTRACT

An apparatus for producing power from a geothermal fluid that is a mixture of high pressure steam and brine comprising a separator, a steam turbine coupled to a generator, a steam condenser, the vaporized organic fluid is supplied to a superheater, an organic vapor turbine coupled to a generator, an organic vapor condenser. The apparatus further comprises a preheater which preheats the organic condensate and produces a stream of pre-heated organic fluid that is supplied to the steam condenser as well as a stream of cooled steam condensate. A recuperator is provided for transferring heat from the heat depleted organic fluid produced by the organic vapor turbine to organic condensate produced by the organic vapor condenser. The heated organic condensate produced by the recuperator is supplied to the preheater while cooled, heat depleted organic vapor produced by the recuperator is supplied to the organic vapor condenser. The stream of cooled brine is combined with the stream of cooled steam condensate to form a combined stream of diluted cooled brine that is less susceptible to precipitation of minerals.

16 Claims, 1 Drawing Sheet

APPARATUS AND METHOD FOR PRODUCING POWER USING GEOTHERMAL FLUID

TECHNICAL FIELD

This invention relates to an apparatus and method for producing power using geothermal fluid, and more particularly to an apparatus and method for producing power using a geothermal fluid wherein a substantial amount of heat is available in geothermal steam separated from brine present in the geothermal fluid.

BACKGROUND OF THE INVENTION

At many geothermal sources in current use, steam in the geothermal fluid exiting production wells is separated from brine, and expanded in a steam turbine for producing power and electricity. Often, the brine is simply discarded because it contains a relatively small amount of heat. However, the relative amounts of steam and brine produced at a given location will depend on the temperature at which the separation is carried out.

Recently, heat present in the brine has been utilized for producing power by employing a binary cycle in which, for example, steam in the geothermal fluid is used in a steam turbine, and the exhaust steam and brine in the geothermal fluid are used to supply heat to vaporize an organic fluid that is expanded in a vapor turbine for generating power. Also, often heat in the brine has been used merely for preheating the working fluid operating the binary power cycle.

Binary cycle systems are reviewed by V. K. Johnson et al., in a 1969 publication *Timarit VFI*, entitled "Optimisation of Geothermal Power Plant by use of Freon Vapour Cycle" which describes a number of arrangements for using geothermal fluid composed of a mixture of brine and steam. Scheme 4 proposed in this article discloses separating the steam from the brine, and then passing the steam directly to a steam turbine. The steam exhausted from this turbine condenses at a slight vacuum in a Freon cooled steam condenser. The brine passes directly to a first heat exchanger which heats the Freon from the steam condenser before the heated Freon is passed to a Freon turbine. The Freon exhausted from this turbine is condensed using ambient cooling water. The spent brine from the first heat exchanger is combined with the steam condensate from the steam condenser to furnish a mixture that passes through a second heat exchanger for preheating the condensed Freon before it is recirculated by supplying it to the steam condenser. The cooled mixture from the second heat exchanger is then disposed of.

Although the steam condenser in scheme 4 operates at a slight vacuum, and the arrangement of the heat exchangers enables relatively efficient use of the available heat, the actual overall efficiency of this scheme is not high because the brine in not used efficiently. It is an object of the present invention, therefore, to provide a new and improved apparatus and method for using the same in which the overall efficiency will be relatively high due to the efficient use of the relatively high temperature steam and brine present in the geothermal fluid.

BRIEF DESCRIPTION OF THE INVENTION

Apparatus according to the present invention for producing power using a geothermal fluid that is a mixture of high pressure steam and brine includes a separator for separating the geothermal fluid into a steam stream and a brine stream. A steam turbine coupled to a generator expands the steam and drives the generator producing power and heat depleted steam. A steam condenser supplied with an organic fluid condenses the heat depleted steam and produces a stream of vaporized organic fluid and a stream of steam condensate. The vaporized organic fluid is supplied to a superheater which is responsive to the brine stream for superheating the vaporized organic fluid and producing a stream of superheated organic vapor and a stream of cooled brine. An organic vapor turbine coupled to a generator expands the superheated organic vapor and drives the generator producing power and heat depleted organic fluid. An organic vapor condenser condenses the heat depleted organic fluid and produces organic condensate which is supplied to a preheater responsive to the steam condensate which preheats the organic condensate and produces a stream of pre-heated organic fluid that is supplied to the steam condenser and a stream of cooled steam condensate.

The invention provides a recuperator responsive to the heat depleted organic fluid produced by the organic vapor turbine for heating the organic condensate produced by the organic vapor condenser. The recuperator produces further heat depleted organic fluid which is supplied to the condenser and heated organic fluid condensate which is supplied to the preheater. Because the heat depleted organic vapor exhausted from organic vapor turbine (although at a lower temperature and pressure than the vapor supplied to the turbine) will be highly superheated, the recuperator serves to recover some of this superheat instead of rejecting this heat to the coolant for the organic vapor condenser. The stream of cooled brine is combined with the stream of cooled steam condensate to form a combined stream of diluted cooled brine that is less susceptible to precipitation of minerals.

Furthermore, by superheating the organic working fluid vapor in accordance with the present invention, some of the heat transferred can be used to produce more power from the expansion of the vapor in the organic vapor turbine. In addition, the use of a recuperator permits a substantial amount of the remainder of the heat transferred actually at a relatively high temperature from the brine to the organic vapor in the superheater to be utilized for heating organic fluid condensate exiting the organic fluid condenser at a relatively low temperature.

In a further embodiment of the present invention, a two-stage, high pressure module and low pressure module organic Rankine cycle turbine can be used. In this embodiment, superheating can be carried out advantageously both before the high pressure module turbine as well as before the low pressure turbine.

Additionally, the combined stream of cooled brine and cooled steam condensate may be supplied to a re-injection well and injected into the ground. The cooled steam condensate produced by the preheater will be warmer by reason of the presence of the recuperator than condensate produced without the recuperator, with the result that the combined stream of diluted cooled brine will also be warmer thus serving to suppress precipitation of minerals in the piping carrying the diluted cooled brine.

BRIEF DESCRIPTION OF THE DRAWINGS

Embodiments of the invention are described by way of example and with reference to the accompanying drawings wherein.

DETAILED DESCRIPTION

Figure 1:
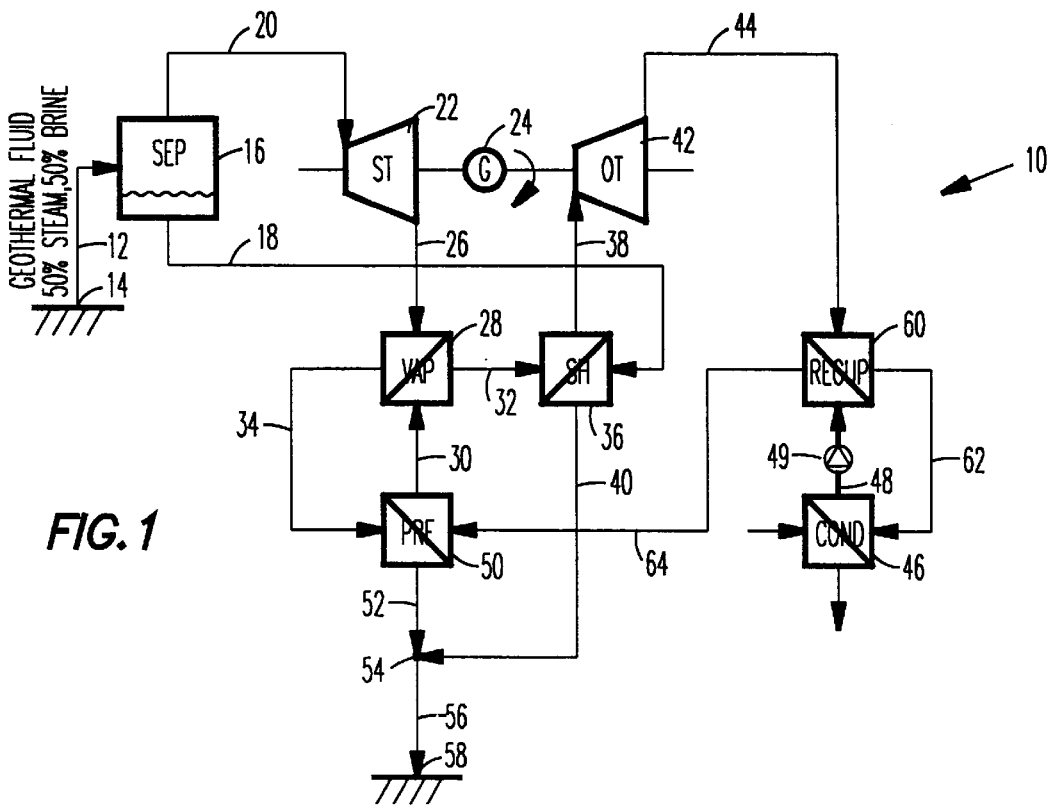
FIG. 1 is a block diagram of apparatus according to one embodiment of the present invention.

Referring now to the drawings, reference numeral 10 in FIG. 1 designates apparatus according to one embodiment of the present invention for producing power using geothermal fluid in conduit 12 produced by production well 14. The geothermal fluid in conduit 12 comprises a mixture of high pressure steam and brine wherein a substantial amount of heat is available in the steam.

Apparatus 10 includes separator 16 for separating the geothermal fluid in conduit 12 into brine stream 18 and high pressure steam stream 20. Steam turbine 22 coupled to generator 24 receives stream 20 and expands the high pressure steam thereby driving the generator and producing power, and producing heat depleted steam in the exhaust 26 of the turbine. Steam condenser 28, preferably operating at a pressure above atmospheric pressure on the steam side, is supplied with organic fluid in conduit 30, and is responsive to the heat depleted steam for vaporizing the organic fluid and producing stream 32 of vaporized organic fluid and stream 34 of steam condensate.

Superheater 36 is responsive to brine stream 18 for superheating stream 32 of vaporized organic fluid and producing stream 38 of superheated organic vapor and stream 40 of cooled brine. Stream 38 is applied to organic vapor turbine 42 coupled to a generator, preferably generator 24 (although turbine 42 could be coupled to a separate generator), for expanding the superheated organic vapor thereby driving the generator and producing power, and producing heat depleted organic fluid in exhaust 44 of turbine 42.

Fluid in exhaust 44 is applied to organic vapor condenser 46 for condensing the heat depleted organic fluid and producing organic condensate in conduit 48. Cycle pump 49 delivers organic condensate in conduit 48 to preheater 50 which is responsive to stream 34 of steam condensate for preheating the organic condensate and producing stream 30 of pre-heated organic fluid that is supplied to steam condenser 28, and stream 52 of cooled steam condensate. Means 54 serves to combine stream 52 of cooled brine with stream 40 of cooled steam condensate to form combined stream 56. Preferably, combined stream 56 is injected into the ground via re-injection well 58.

Because of the inclined bell-shaped nature of the T-S diagram for most organic fluids, and particularly for pentane, which is the preferred organic fluid, expansion of the organic fluid in turbine 42 will occur in the superheat region with the result that exhaust 44 of turbine 42 will contain a considerable amount of superheat that is rejected into the coolant for condenser 46 and thus not utilized. For this reason, recuperator 60 is interposed between the exhaust of turbine 42 and condenser 46 for recovering some of the superheat in exhaust 44.

Recuperator 60 transfers a substantial amount of the superheat in the heat depleted organic fluid in exhaust 44 to organic condensate in conduit 48 before the condensate is supplied to preheater 50 in conduit 64. The further heat depleted organic fluid in conduit 62 is supplied to condenser 46.

Figure 2:
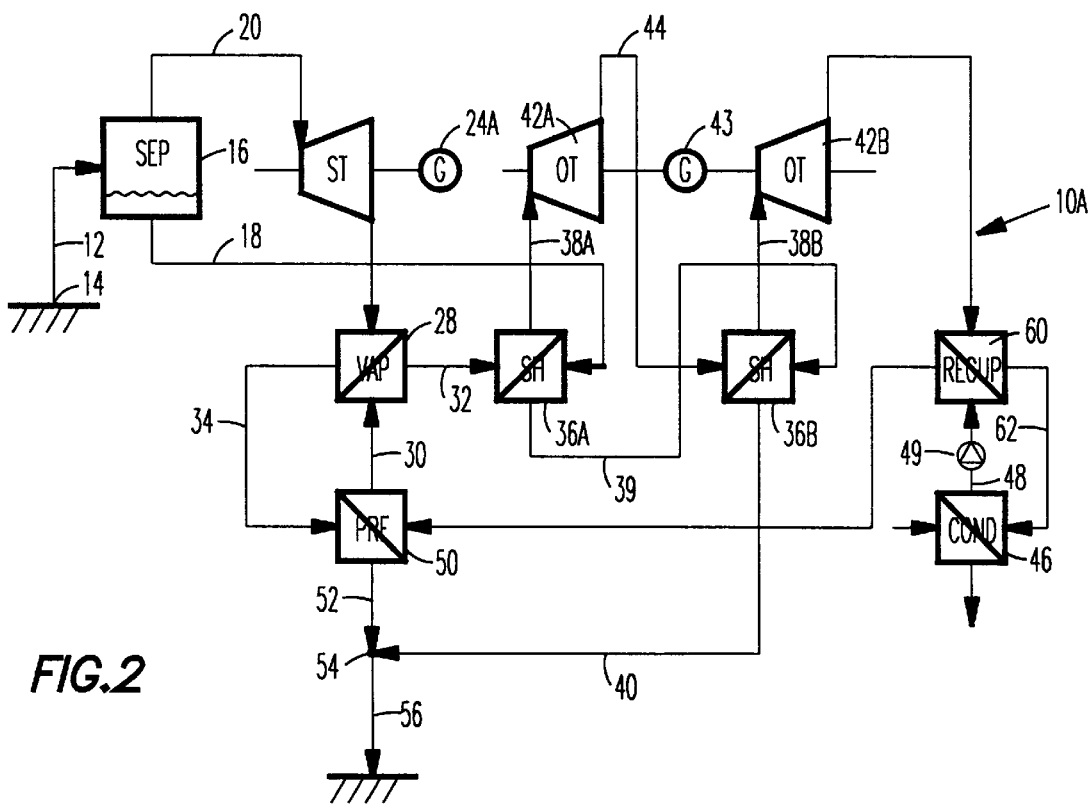
FIG. 2 is a block diagram of apparatus according to a further embodiment of the present invention.

Referring now to FIG. 2, reference numeral 10A designates a further embodiment of the present invention which is similar to the embodiment described with reference to FIG. 1. In embodiment 10A, high pressure turbine module 42A and low pressure turbine module 42B are used for expanding vaporized organic fluid in a manner similar to that shown in U.S. Pat. No. 5,531,073 (the disclosure of which is hereby incorporated by reference). These turbines usually operate at low speeds, e.g., 1500 or 1800 RPM.

Preferably, superheaters 36A and 36B are provided for superheating vaporized organic fluid respectively entering high pressure turbine module 42A and low pressure turbine module 42B. Superheater 36A, in response to input brine stream 18 and input vaporized organic fluid stream 32, produces output stream 38A of superheated organic fluid which is supplied to high pressure turbine module 42A, and output stream 39 of heat depleted brine. Superheater 36B, in response to input stream 39 of heat depleted brine and input stream 44 of heat depleted organic vapor exhausted from high pressure turbine 42A, produces output stream 38B of superheated organic vapor which is supplied to low pressure turbine module 42B, and output stream 40 of further heat depleted brine.

Preferably, common electric generator 43 is interposed between and coupled to turbines 42A and 42B; and separate electric generator 24A is coupled only to steam turbine 22. Moreover, under some conditions, only superheater 36B would be used.

By operating the steam side of steam condenser 28 at pressures above atmospheric pressure in a binary fluid power plant system, all of the components of the system will operate at pressures above atmospheric pressure. This will facilitate, for example, extraction of non-condensable gases from the steam side of condenser 28, as well as permitting exploitation of the benefit of cool climates without the need to operate under deep vacuum conditions.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. Apparatus for producing power using a geothermal fluid that is a mixture of high pressure steam and brine, said apparatus comprising;

a) a separator for separating said geothermal; fluid into a brine stream and a steam stream;

b) a steam turbine coupled to a generator for expanding said high pressure steam stream thereby driving said generator and producing power, and producing heat depleted steam;

c) a steam condenser responsive to a supplied stream of organic fluid and to said heat depleted steam for producing a stream of vaporized organic fluid and a stream of steam condensate;

d) a superheater responsive to said brine stream and to said vaporized organic fluid stream for producing a stream of superheated organic vapor and a stream of cooled brine;

e) an organic vapor turbine coupled to a generator for expanding said superheated organic vapor thereby driving the last-mentioned generator and producing power, and producing heat depleted organic fluid;

f) an organic vapor condenser for condensing said heat depleted organic fluid and producing organic condensate;

g) a preheater responsive to said steam condensate and to said organic condensate for producing a stream of pre-heated organic fluid and a stream of cooled steam condensate;

h) means for supplying said pre-heated organic fluid to said steam condenser; and i) means for combining said stream of cooled brine with said stream of cooled steam condensate to form a combined stream.

2. Apparatus according to claim 1 including a recuperator responsive to said heat depleted organic fluid and to said organic condensate for producing further heat depleted organic fluid and heated organic fluid, means for supplying said heated organic fluid to said preheater, and means for supplying said further heat depleted organic fluid to said condenser.

3. Apparatus according to claim 2 including means for injecting said combined stream into the ground.

4. Apparatus according to claim 1 wherein said steam turbine and said organic vapor turbine are coupled to the same generator.

5. Apparatus according to claim 1 wherein said steam turbine is a back-pressure turbine that produces low pressure steam at a pressure above atmospheric pressure.

6. A method for producing power using a geothermal fluid that is a mixture of high pressure steam and brine, said apparatus comprising;

a) separating said geothermal fluid into a brine stream and a steam stream;

b) expanding said high pressure steam stream for producing power and low pressure steam;

c) condensing said low pressure steam with a stream of supplied organic fluid for producing a stream of vaporized organic fluid and a stream of steam condensate;

d) superheating said stream of vaporized organic fluid using heat contained in said brine stream for producing a stream of superheated organic vapor and a stream of cooled brine;

e) expanding said superheated organic vapor for producing power and low pressure organic vapor;

f) transferring heat in said low pressure organic vapor to organic condensate and producing a stream of heated organic fluid condensate and a stream of cooled low pressure organic vapor;

g) condensing said stream of cooled low pressure organic vapor and producing said organic condensate; and h) preheating said stream of of heated organic fluid condensate for producing said stream of supplied organic fluid and a stream of cooled steam condensate.

7. A method according to claim 6 including combining said stream of cooled brine with said stream of cooled steam condensate to form a combined stream.

8. A method according to claim 7 including injecting said combined stream into the ground.

9. A method according to claim 6 wherein said steam stream is expanded in a steam turbine and said superheated organic vapor is expanded in an organic vapor turbine, and both turbines are coupled to a single generator.

10. A method according to claim 6 wherein the pressure of said low pressure steam is above atmospheric pressure.

11. Apparatus for producing power using a geothermal fluid that is a mixture of high pressure steam and brine, said apparatus comprising;

a) a separator for separating said geothermal; fluid into a brine stream and a steam stream;

b) a steam turbine coupled to a generator for expanding said high pressure steam stream thereby driving said generator and producing power, and producing heat depleted steam;

c) a steam condenser supplied with an organic fluid and responsive to said heat depleted steam for vaporizing said organic fluid and producing a stream of vaporized organic fluid and a stream of steam condensate;

d) a first superheater responsive to said brine stream for superheating said stream of vaporized organic fluid and producing a stream of superheated organic vapor and a stream of heat depleted brine;

e) a first organic vapor turbine coupled to a generator for expanding said superheated organic vapor thereby driving the last mentioned generator and producing power, and producing a stream of heat depleted organic fluid;

f) a second superheater responsive to said stream of heat depleted brine for superheating said stream of heat depleted organic fluid and producing a stream of re-superheated organic vapor and a stream of further heat depleted brine;

g) a second organic vapor turbine coupled to a generator for expanding the stream of re-superheated organic vapor thereby driving the last mentioned generator and producing power, and producing a stream of further heat depleted organic fluid;

h) a recuperator responsive to said further heat depleted organic fluid and to organic fluid condensate for producing heated organic fluid condensate and still further heat depleted organic fluid;

i) an organic vapor condenser for condensing said still further heat depleted organic fluid and producing said organic fluid condensate;

j) a preheater responsive to said steam condensate and to said heated organic fluid condensate for producing a stream of pre-heated organic fluid and a stream of further cooled steam condensate;

k) means for supplying said stream of pre-heated organic fluid to said steam condenser; and l) means for combining said stream of further heat depleted brine with said stream of further cooled steam condensate to form a combined stream.

12. Apparatus according to claim 11 wherein a single generator is coupled to both said first and second organic vapor turbines.

13. Apparatus according to claim 1 wherein said organic fluid is pentane.

14. A method according to claim 6 wherein condensing said low pressure steam with a stream of supplied organic fluid is carried out by condensing said low pressure steam with a stream of supplied pentane.

15. Apparatus according to claim 11 wherein said organic fluid is pentane.

16. Apparatus according to claim 1 including:

a) a further organic vapor turbine coupled to a generator for receiving stream of vaporized organic fluid prior to supplying it to said superheater, said further organic vapor turbine expanding said vaporized organic fluid thereby driving the last-mentioned generator and producing power, and producing expanded organic fluid; and b) means for supplying said expanded organic fluid to said superheater.

* * * * *